United States Patent [19]

Galanes

[11] Patent Number: 5,280,849

[45] Date of Patent: Jan. 25, 1994

[54] WELDING METHOD FOR ROTATING SHAFTS

[75] Inventor: George W. Galanes, Wheaton, Ill.

[73] Assignee: Commonwealth Edison, Chicago, Ill.

[21] Appl. No.: 957,225

[22] Filed: Oct. 6, 1992

[51] Int. Cl.⁵ .................... B32K 31/02; B23P 6/04
[52] U.S. Cl. .................... 228/119; 228/165; 228/231; 228/232; 29/402.07; 219/76.14
[58] Field of Search .......... 228/119, 165, 231, 263.14, 228/232, 239, 244, 168, 169; 29/402.01, 402.18, 402.07; 219/76.14

[56] References Cited

U.S. PATENT DOCUMENTS

| | | | |
|---|---|---|---|
| 2,276,190 | 3/1942 | Gunnert | 228/239 |
| 4,503,129 | 3/1985 | Okuda et al. | 428/562 |
| 4,633,554 | 1/1987 | Clark et al. | 29/402.07 |
| 4,896,814 | 1/1990 | Allain et al. | 228/165 |
| 4,897,519 | 1/1990 | Clark et al. | 219/76.14 |
| 4,902,888 | 2/1990 | Clark et al. | 228/119 |
| 4,994,647 | 2/1991 | Tanaka et al. | 219/146.23 |
| 5,049,716 | 9/1991 | Dunmire et al. | 219/76.14 |

FOREIGN PATENT DOCUMENTS 56-163091 12/1981 Japan .................... 228/119

OTHER PUBLICATIONS

"Preheating for Welding," Reprinted from *The Welding Journal,* Apr., 1977 (as Dated by Office).
U.S. Application 06/727,175 (ABD), Filed Apr. 25, 1985, pp. 1–9, Incorp. By Ref. In U.S. Pat. No. 4,633,554, Patented Jan. 6, 1987.
Article—"Weldability Studies in Cr-Mo-V Turbine Rotor Steel", by Kim et al., *Journal of Materials Engineering,* vol. 10, No. 2, 1988.

Primary Examiner—Paula A. Bradley
Assistant Examiner—Jeffrey T. Knapp
Attorney, Agent, or Firm—Willian Brinks Hofer Gilson & Lione

[57] ABSTRACT

An improved welding method is provided for repairing rotating shafts, particularly cracked high pressure steam turbine rotors. The welding method preferably employs a 2.25Cr—1.0Mo—0.3V-type welding filler metal, preferably deposited using a narrow groove automatic gas tungsten arc welding technique. A narrow groove is formed in the rotor to remove the crack. The groove is preheated, filled with the welding filler metal, and postheated, resulting in a strong, high temperature resistant, long lasting weld.

42 Claims, 3 Drawing Sheets

WELDING METHOD FOR ROTATING SHAFTS

FIELD OF THE INVENTION

The present invention relates to an improved welding method for repairing rotating shafts, particularly cracked high pressure steam turbine rotors.

BACKGROUND OF THE INVENTION

Large rotating shafts are used in many applications, such as turbines, fans, and pumps. The use in turbines often exposes them to environments and load cycling which can lead to cracking. Examples of use in the electric utility industry are high and intermediate pressure steam turbines, boiler feed pump turbines, and gas turbines.

High and intermediate pressure steam turbines are commonly used by modern electric utility companies for the purpose of driving generators to produce electric power. In order to operate safely and effectively, the components of the steam turbines, including the rotors, discs, blades, and stationary diaphragms are typically fabricated from heavy structural alloy steels of the chromium-molybdenum type. The high pressure steam turbines generally operate at temperatures higher than about 500°, however, certain components of the steam turbine are exposed to even higher operating temperatures. The hottest component of a steam turbine is typically the first stage of the rotor. During normal operation, sections of the rotor are typically exposed to temperatures higher than 850° F., are often exposed to temperatures about 900° F., and can be exposed to temperatures as high as 1050° F.

The useful life of the various steel-fabricated steam turbine components depends heavily on the thermal stresses endured by the components. Because the rotors are typically exposed to much higher temperatures than the other components, the rotors tend to be susceptible to creep damage. In particular, the high temperature regions of the high pressure steam turbine rotors have increased susceptibility to cracking due to long-term thermal fatigue and creep from power plant load cycling. Similar damage, such as gouging, can occur from mechanical interference between the rotor and stationary components. In the past, the damaged rotor components have simply been replaced. However, replacement of the rotors requires very high capital costs and very long lead times for procurement.

An alternative approach which is currently used is to discard only the section of the rotor which is exposed to temperatures above 850° F., including an appropriate portion surrounding the high temperature region, and replacing the discarded section with a new forging that can be welded to the remaining portion of the older rotor in a lower temperature region. In order for this approach to be successful, the replaced section of the rotor must be large enough to include both the high temperature region (i.e., above 850° F.) and enough of the surrounding region that the weld can be made in an area where the operating temperature does not exceed about 850° F. This conventional welding approach includes the use of a filler metal which cannot withstand prolonged exposure to temperatures higher than about 850° F.

The filler metal used in the above-mentioned conventional welding approach is composed of about 0.12 weight percent C, 0.4–0.7 weight percent Mn, 0.4–0.7 weight percent Si, 0.025 weight percent P, 0.025 weight percent S, 0.20 weight percent Ni, 2.3–2.7 weight percent Cr, and 0.9–1.2 weight percent Mo. This conventional filler metal is commonly known as a 2¼ Cr-1Mo filler metal. The disadvantage of the conventional welding approach is that it represents an expensive repair program even if only minor cracking is observed in the high temperature region of the high pressure steam turbine rotor. Also, long lead times are often required for procurement of the replacement forgings.

Methods of repair in which a wide groove is machined in the rotor shaft to remove a crack and the groove is filled with weld metal are well known in the art. The wide groove may be semi-circular with a radius deep enough to fully remove the crack, or may be machined with straight walls and a large angle of greater than 24 degrees between opposing walls. The wide groove method requires a large amount of weld filler metal, increasing the welding time and chance of distortion. The large weld area also increases the chance of weld defects.

Various other welding filler metals are also known in the art for different high temperature applications. U.S. Pat. No. 4,994,647, issued to Tanaka et al., discloses welding deposit materials intended for use in high temperature applications (e.g., 482° C. or 900° F.). The disclosed uses are boilers, pressure vessels and chemical reactors. The reference teaches that 2.25-3% Cr—1% Mo steels are unsatisfactory for application to pressure vessels which are used under such high temperature and pressure conditions, such as required in a coal liquefaction plant. However, increased strength and increased resistance to hydrogen attack are imparted by adding V and Nb to the covered electrode.

U.S. Pat. No. 4,503,129, issued to Okuda et al., discloses a shielded metal arc welding electro for chromium-molybdenum low alloy steels. The reference states that chromium-molybdenum low alloy steels, including 2.25Cr—1Mo steel, are widely applied industrially as materials of high heat resistance in the fields of boilers of high temperature and pressure, petroleum industry, synthetic chemistry, and for uses requiring resistance to hydrogen of high temperature and pressure. The reference discloses a welding core wire and/or flux containing chromium and molybdenum, as well as carbon, manganese, silicon, aluminum, nitrogen and nickel. The reference further discloses that at least one element selected from vanadium, titanium, niobium and boron, can be added to the welding flux and/or the core wire to improve high temperature strength.

An article by Kim, et al. entitled "Weldability Studies In Cr—Mo—V Turbine Rotor Steel", *Journal Of Materials Engineering*, Vol. 10, No. 2, 1988, discusses a study undertaken to establish the weldability of a high pressure steam turbine rotor constructed using 1.0Cr—1.0Mo—0.25V steel. The reference discusses the performance of a post weld stress relief heat treatment to prevent cracking of the weld zone during subsequent exposure to elevated temperature service, and to restore its notch toughness. The reference discloses that a 2.25Cr—1Mo filler wire was used in the production of welds. After welding, and heat treatment, impact tests were performed on the weld specimens. The article concluded that postweld heat treatment at 1050° F., caused a reduction in impact properties. On the other hand, postweld heat treatment at 1250° F. caused some improvement in impact properties.

U.S. Pat. No. 4,897,519, issued to Clark et al., discloses a method for repairing worn surfaces of Cr—Mo—V steam turbine components which focuses on the use of a ferrous welding metal including about 4.00 to 19.0 weight percent chromium, 0.43 to 2.1 weight percent molybdenum, 0.09 to 0.5 weight percent vanadium, 0.03 to 0.20 weight percent niobium, 0.0 to 0.08 weight percent aluminum, 0.0 to 0.20 weight percent copper, 0.005 to 0.06 weight percent nitrogen, 0.04 to 0.22 weight percent carbon, 0.15 to 1.0 weight percent manganese, 0.15 to 1.0 weight percent silicon, 0.0 to 0.2 weight percent phosphorous, 0.0 to 0.016 weight percent sulfur, 0.0 to 0.8 weight percent nickel, and the balance iron. The alloy is welded to the worn surface of the turbine component using gas tungsten arc welding, plasma arc welding, electron beam welding, laser beam welding, or gas metal arc welding. The disclosed method is for repairing worn surfaces and no mention is made of repairing rotor shaft cracks.

U.S. Pat. No. 4,903,888, issued to Clark et al., is also directed toward a method for repairing worn surfaces of turbine rotors, including high pressure turbine rotors. A first layer of weld metal is deposited on a worn surface of a turbine component. Then, a second layer of weld metal is deposited over the first layer, using a higher application (weld heat input) temperature, for tempering at least part of the heat-affected zone created in the base metal by the depositing of the first layer.

U.S. Pat. No. 5,049,716, issued to Dunmire et al., discloses methods for providing erosion resistant surfaces to carbon steel turbine components. The surface is welded with a first weldment including steel having at least 12 weight percent chromium. The weldment is deposited on the carbon steel surface at a high rate of welding speed of about 24–52 inches per minute, in a first pass thickness of less than about 0.1 inches.

There is a demand among electric power utilities for a welding method which can be used to repair cracked high pressure steam turbine rotors without requiring extensive down time, capital expenditure, or replacement of rotor sections. It is important that the repair weld be able to meet or exceed the mechanical properties of the rotor base material, during and after long-term exposure to temperatures within the range of about 850° F. to about 1050° F. It is believed that such a welding method could extend the operating life of high pressure steam turbine rotors for an additional 10 to 20 years, resulting in savings of millions of dollars to electric utility companies.

SUMMARY OF THE INVENTION

The present invention is directed to an improved welding method for repairing rotating shafts, particularly cracked high pressure steam turbine rotor shafts. The improved welding method includes two aspects, a specific welding material and a specific welding procedure.

The welding material is a ferrous-based filler metal including about 1.75–2.75 weight percent chromium, about 0.6–1.4 weight percent molybdenum, and about 0.2–0.4 weight percent vanadium. The most preferred welding material includes about 2.25 weight percent chromium, about 1.0 weight percent molybdenum, and about 0.3 weight percent vanadium. The most preferred welding material can be described, in common terms, as a 2.25Cr—1.0Mo—0.3V filler metal.

The repair process involves, first, the removal of the crack in the steam turbine rotor shaft. The crack can be removed by machining (i.e., excavating) enough metal from the rotor shaft to form an excavation or groove which is deep enough, wide enough and long enough to completely surround the location of the original crack. The excavation or groove should be no wider than necessary to completely remove the crack, but should be slightly wider at the top than at the bottom, so that the walls of the groove rise at an angle of about two to three degrees from its center line.

Next, the groove is filled using a narrow groove automatic welding process. A suitable narrow groove process is the automatic gas tungsten arc welding (GTAW) process. The welding process includes a heating step, a welding step which includes enough passes to fill the groove with the filler metal, and a post weld heat treatment step.

Optimum techniques are described herein which can be used to repair cracks occurring in even the highest temperature regions of high pressure steam turbine rotors, by forming a weld whose thermal and mechanical properties match or exceed the properties of the rotor base material. Using the techniques described herein, the life of a high pressure steam turbine rotor can be significantly extended by weld repair if cracking occurs, with full confidence in the suitability of the weld for extended service.

With the foregoing in mind, it is a feature and advantage of the invention to provide an improved method for repairing cracked or gouged high pressure steam turbine rotors, which allows the rotors to be repaired without replacing sections of the rotor shafts.

It is also a feature and advantage of the invention to provide an improved method for repairing cracked or gouged high pressure steam turbine rotors, which can be used to repair even the highest temperature sections of the rotors and which provides a weld that withstands prolonged exposure to temperatures of 850° F. to 1050° F.

It is also a feature and advantage of the invention to provide an improved method for repairing cracked or gouged high pressure steam turbine rotors, which significantly reduces the expense and down time needed to complete the repair.

It is also a feature and advantage of the invention to provide an improved method for repairing cracked or gouged high pressure steam turbine rotors, which reduces the size of the weld repair, reducing the amount of filler metal, reducing the welding time by about 3 to 4 times, decreasing the chance of distortion, and reducing the chance of weld defects.

These and other features and advantages of the invention will become further apparent from the following detailed description of the presently preferred embodiments, when read in conjunction with the accompanying figures. The detailed description and figures are to be construed as illustrative rather than limitative, with the scope of the invention being defined by the appended claims and equivalents thereof.

DETAILED DESCRIPTION OF THE PRESENTLY PREFERRED EMBODIMENTS

The method of the present invention is generally intended for repairing cracked high pressure steam turbine rotors fabricated from chromium-molybdenum type steels. More specifically, the rotors may be fabricated from ASTM A470 Class 7 or 8 material. The Class 7 steel includes a maximum of 0.28% by weight carbon, 0.20-0.60% by weight manganese, a maximum of 0.012% by weight phosphorus, a maximum of 0.015% by weight sulfur, a maximum of 0.10% by weight silicon, $3.25 \geq 4.00\%$ by weight nickel, 1.25-2.00% by weight chromium, 0.25-0.60% by weight molybdenum, 0.05-0.15% by weight vanadium, and the balance substantially of iron. The Class 7 steel can be referred to, in common terms, as a 1.25—2.00-Cr—0.25-0.60Mo—0.05-0.15V-type steel.

The class 8 steel includes 0.25-0.35% by weight carbon, a maximum of 1.00% by weight manganese, a maximum of 0.012% by weight phosphorous, a maximum of 0.015% by weight sulfur, 0.15-0.35% by weight silicon, a maximum of 0.75% by weight nickel, 1.05-1.50% by weight chromium, 1.00-1.50% by weight molybdenum, 0.20-0.30% by weight vanadium, and the balance substantially of iron. The Class 8 steel can be referred to, in common terms, as a 1.05-1.50-Cr—1.00-1.50Mo—0.20-0.30V-type steel.

Figure 1:
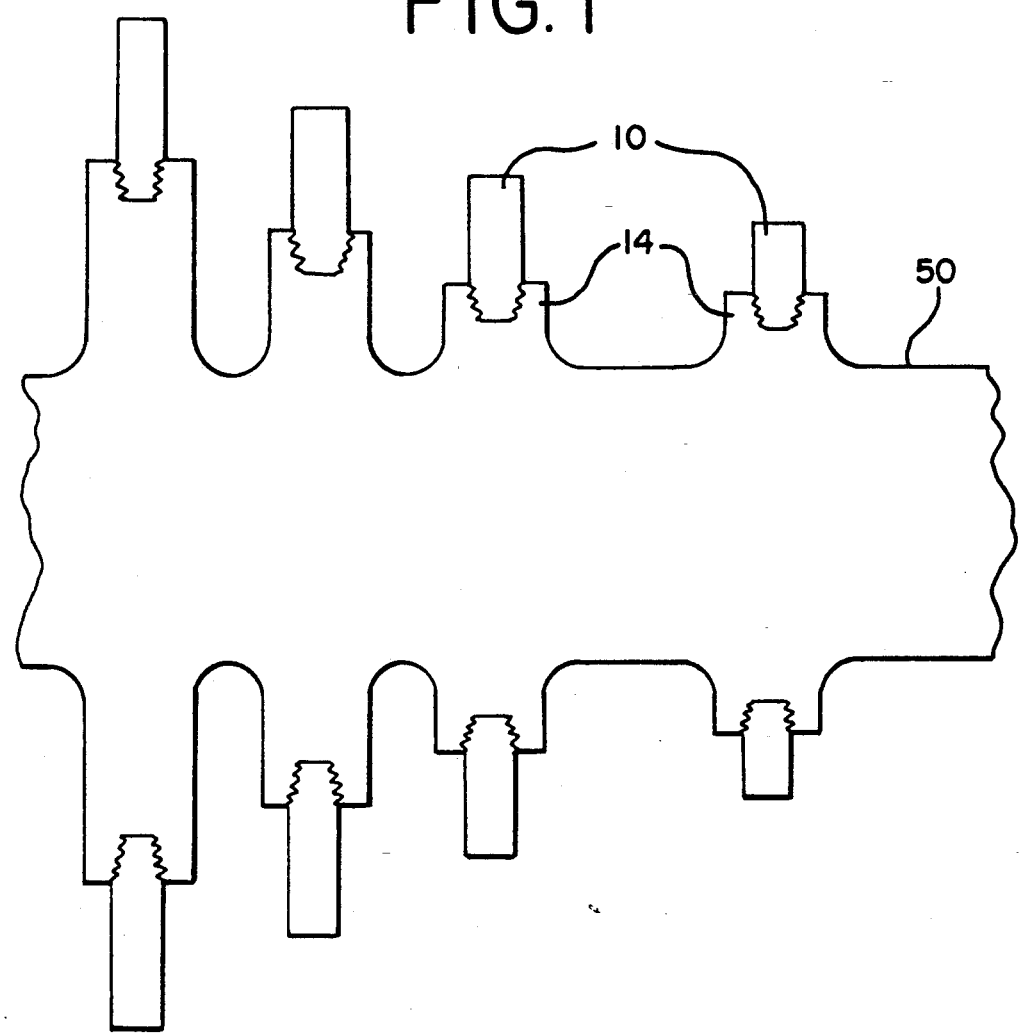
FIG. 1 is a perspective view of a typical high pressure steam turbine rotor, whose shaft can be repaired according to the techniques described herein.

An overall plan view of a high pressure steam turbine rotor is shown in FIG. 1. High temperature steam entering through an inlet nozzle expands through several rows of turbine blades 10 which are attached to the rotor shaft 50 by means of discs 14. The steam action on the turbine blades 10 rotates the rotor shaft 50, which is coupled to an electric generator (not shown).

Figure 2:
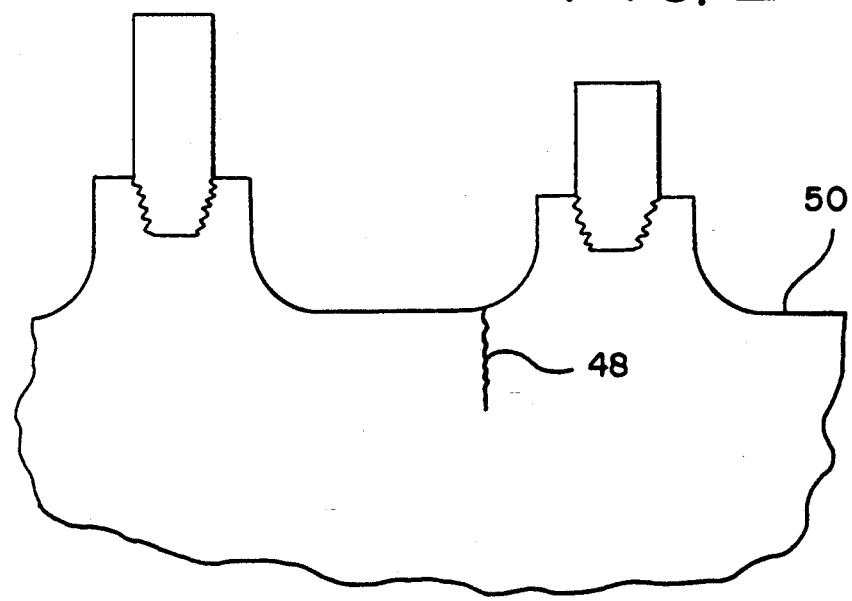
FIG. 2 is a close-up view of the high temperature region of a typical high pressure steam turbine rotor, and shows a typical crack appearing in the rotor shaft.

A close-up of the high temperature region of the high pressure steam turbine rotor, in which a crack is present in the rotor shaft, is show in FIG. 2. The cracks 48 are typically circumferential to the rotor shaft 50 and may extend up to 360° around the rotor shaft 50. The cracks 48 may be as much as four inches deep. The cracks 48 initiate from thermal fatigue and can propagate from a fatigue and creep mechanism.

Figure 3A:
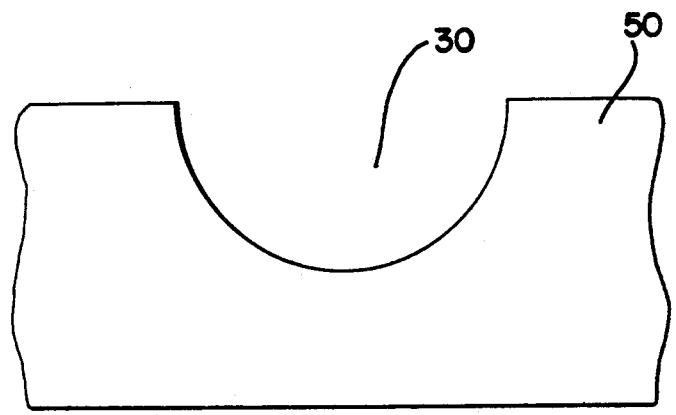
FIG. 3a is a close-up view of the cracked region of the rotor shaft with a semi-circular wide groove machined out of the rotor shaft as practiced in the prior art.
Figure 3B:
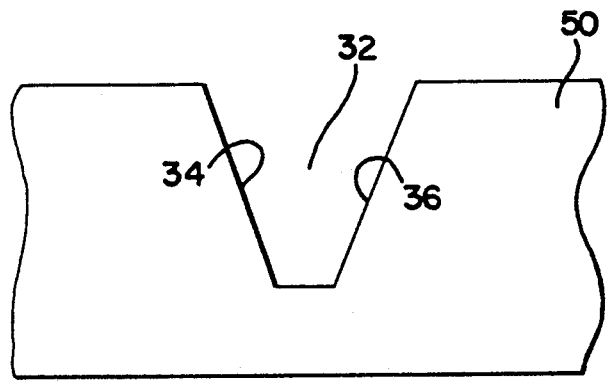
FIG. 3b is similar to FIG. 3a, except a wide angle groove has been machined out of the rotor shaft as practiced in the prior art.

The machining required for the prior art wide groove repair method is shown in FIG. 3a and FIG. 3b. FIG. 3a illustrates the semi-circular wide groove method wherein the semi-circle 30 is machined from the rotor shaft 50 with a radius deep enough to fully remove the crack 48. FIG. 3b illustrates the wide angle groove method wherein the wide angle 32 is machined in the rotor shaft 50 to fully remove the crack 48 and the two sides 34 and 36 are separated by an angle of greater than 24 degrees.

Figure 4:
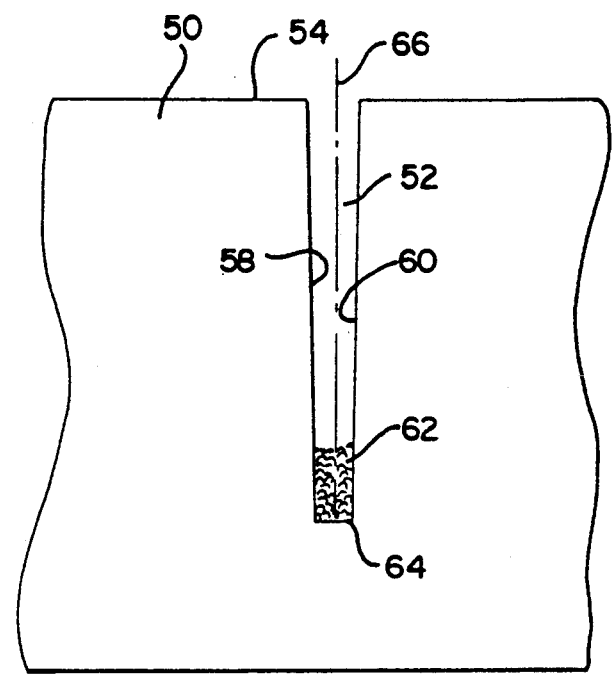
FIG. 4 is similar to FIG. 3a, except a narrow angle groove has been machined out of the rotor shaft as taught by this invention.

The first step of the repair method of the invention is to remove the crack 48 from the rotor shaft 50 by machining a groove 52 in the rotor shaft 50 as shown in FIG. 4. The groove 52 can be machined using a lathe or portable fly cutter. The groove 52 should be wide enough, deep enough and long enough to completely remove the cracked portion of the rotor shaft 50. However, the groove 52 should preferably have a depth of no more than about four inches, in order to facilitate ease of welding.

Preferably, the groove 52 will extend 360 degrees circumferentially around the rotor shaft 50, even though the crack 48 will probably not extend all the way around the rotor shaft 50. The purpose of forming the groove 360 degrees circumferentially around the rotor shaft is to allow the welding filler metal to be deposited continuously in the groove about the circumference of the rotor shaft, until the groove is full. The groove 52 should be machined so as to have a floor 64, and two side walls 58 and 60 which rise at angles of less than about five degrees, and preferably about two or three degrees from an imaginary center line 66 which bisects the groove 52 and is perpendicular to the floor 64 and the outer surface 54 of the rotor shaft 50.

The slightly angular configuration of the groove 52 causes the groove 52 to have a semitrapezoidal cross-section as shown in FIG. 3, such that the distance between the walls 58 and 60 of the groove 52 is slightly greater at the outer surface 54 of the rotor shaft 50 than at the floor 64 of the groove 52. This geometry of the groove 52 is ideal for filling using the narrow groove automatic welding technique described below. Overall, the groove 52 should be no wider than is necessary to completely remove the crack 48. For instance, a width of 0.25 inches measured at the floor 64 of the groove 52 is adequate for the removal of most cracks, with a slightly higher width occurring at the top of the groove 52 due to the slanting of the walls 58 and 60.

Figure 5:
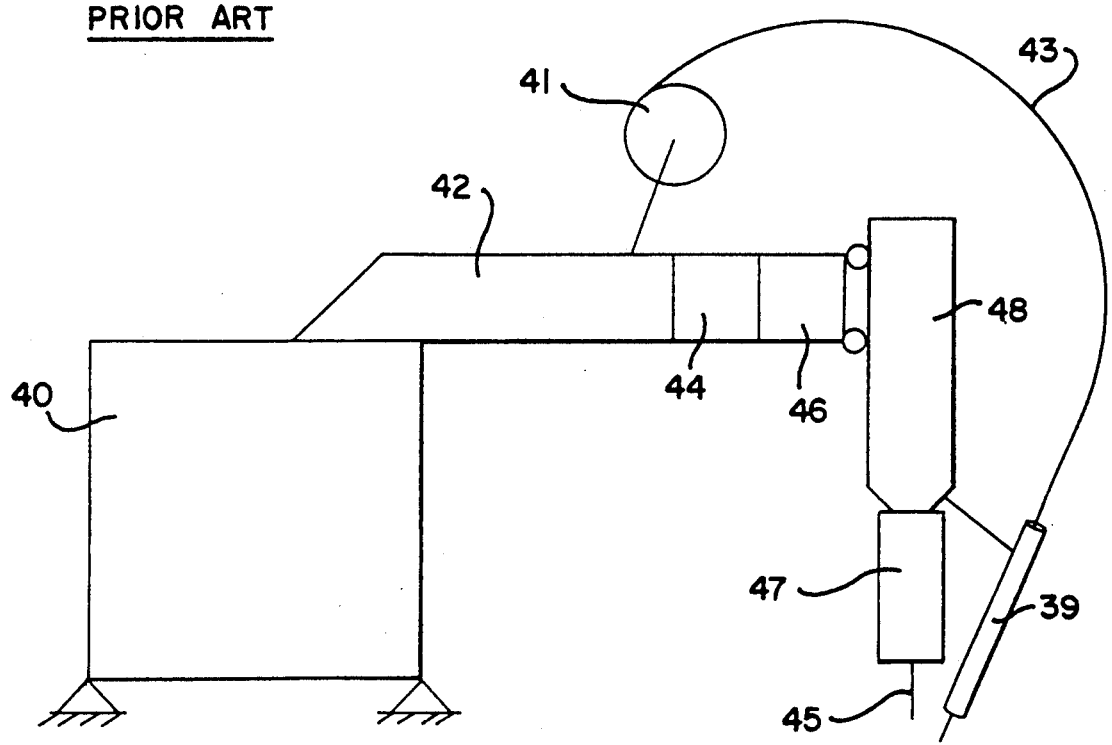
FIG. 5 is a diagram of a typical GTAW welding apparatus used to perform the narrow angle groove welding method of this invention.

The GTAW apparatus typically used to perform the narrow groove weld repair is shown in FIG. 5. A stand 40 containing an electric supply is attached to a support arm 42. The support arm 42 holds a sync-pulse unit 44 and an (x, y, z) manipulator 46, which provides the oscillatory motion for the GTAW torch 48. The GTAW torch 48 supplies an argon purge through the protective sock 47 and holds the tungsten electrode 45. The filler metal wire 43 is fed from a supply feeder 41 which is attached to the support arm 42. The filler metal wire passes through a guide tube 39 to place it in proximity with the tungsten electrode 45. The tips of the filler metal wire and the tungsten electrode 45 are inserted in the groove 52 to perform the weld.

The welding material is a ferrous-based filler metal including about 1.75-2.75 weight percent chromium, about 0.6-1.4 weight percent molybdenum, and about 0.2-0.4 weight percent vanadium. Preferably, the welding material should include about 2.0-2.5 weight percent chromium, about 0.8-1.2 weight percent molybdenum, and about 0.25-0.35 weight percent vanadium. Most preferably, the welding material will include about 2.25 weight percent chromium, about 1.0 weight percent molybdenum, and about 0.3 weight percent vanadium.

In addition to the foregoing, the welding filler metal may contain about 0.05-0.15 weight percent carbon, about 0.5-0.7 weight percent manganese, about 0.10-0.30 weight percent silicon, about 0.005-0.010 weight percent phosphorous, and about 0.001-0.005 weight percent sulfur, with the balance being substantially iron. One welding material which is particularly suitable for use with the method of the invention is a 2.25Cr—1Mo—0.3V filler metal available from Kawasaki of Japan. A typical lot of the Kawasaki filler metal was found to contain 0.12 weight percent carbon, 0.56 weight percent manganese, 0.10 weight percent silicon, 2.48 weight percent chromium, 0.48 weight percent molybdenum, 0.26 weight percent vanadium, 0.010 weight percent phosphorous, 0.003 weight percent sulfur, and a balance of iron.

Prior to welding, the region of the turbine rotor being repaired is preferably preheated to a temperature of about 400° to about 500° F., most preferably about 450° F. The purpose of the preheating step is to limit the rate of cooling in the weld zone during the welding process. The welding is then carried out using a narrow groove welding process. The advantages of using a narrow groove welding process include minimization of the amount of weld filler metal being deposited, and minimization of the amount of residual stress in the deposited filler metal resulting in less shrinkage or distortion of the deposited filler metal. The weld surface is preferably clean, with no debris, oil, or other residue.

The welding is preferably carried out in a lathe with the rotor being maintained in the horizontal position. The reason for this is to allow use of conventional machining and welding equipment. The preferred narrow groove welding process is the automatic gas tungsten arc welding process, commonly known as the GTAW process. The welding conditions are as follows:

TABLE 1
WELDING CONDITIONS FOR GTAW PROCESS

| Parameter | General | Preferred |
| --- | --- | --- |
| Interpass temperature | 500–700° F. | 600° F. |
| Travel speed of welding head | 1–3 in/min. | 1.5–2.0 in./min. |
| Feed rate of filler metal wire | 18–22 in/min. | 20 in./min. |
| Thickness of filler metal wire | 0.040–0.045 in. | 0.045 in. |
| Voltage | 9–11 volts | 9.5 volts |
| Amperage at sidewalls | 240–250 amps | 25 amps |
| Amperage between sidewalls | 140–150 amps | 145 amps |
| Type of current | sync-pulse | sync-pulse |
| Frequency of pulse | 60–62 cycles/sec. | 60 cycles/sec. |
| Tungsten diameter | 1/16–⅛ inch | ⅛ inch |
| Tungsten stickout | 2–4 inch | 4 inch |
| Type of travel | weave | weave |
| Oscillation amplitude | 0.05–0.100 inch | 0.100 inch |
| Primary shield | welding grade | 100% argon |
| Trail shield | welding grade | 100% argon |

The welding can be continued for as many passes as are necessary to fill the groove 52 with weld filler metal. After the welding is completed, the welded filled groove of the turbine rotor shaft, and the surrounding heat affected areas, are preferably postheated at a temperature of about 1200° to about 1300° F., for a period of about 4 to about 8 hours. Most preferably, the postheating is carried out at about 1250° F. for at least about four hours. The purposes of the post weld heat treatment are to reduce the stresses in the weld and to temper the weld and the surrounding heat affected areas of the turbine rotor shaft.

The postheating is preferably accomplished with the turbine rotor in the vertical position. The reason for this is to minimize radial distortion to the rotor shaft. Preferably, the temperature of the welded filled groove of the turbine rotor shaft and surrounding areas is gradually increased at a rate of about 125° F. per hour, for a period of about 5–6 hours, until the post weld heat treatment temperature is reached. Then, after postheating for about four hours, the temperature is lowered at a rate of about 125° F. per hour for a period of about 10–20 hours, until the temperature falls below about 500° F.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

I claim:

1. A method of repairing a cracked or gouged rotating shaft, comprising the steps of:
   forming a narrow groove in the region of the crack or gouge having a sufficient length, width, and depth to completely remove the crack or gouge;
   providing a ferrous-based welding filler metal;
   preheating the groove;
   depositing the welding filler metal in the groove using a narrow groove welding technique, until the filler metal fills the groove; and
   postheating the filled groove;
   wherein the welding filler metal includes about 1.75–2.75 weight percent chromium, about 0.6–1.4 weight percent molybdenum, and about 0.2–0.4 weight percent vanadium.

2. The method of claim 1, wherein the filled groove is postheated at a temperature of about 1200° F. to about 1300° F. for a period of about 4 to about 8 hours.

3. The method of claim 2, wherein the filled groove is postheated at a temperature of about 1250° F. for a period of at least about four hours.

4. The method of claim 1, wherein the groove is preheated to a temperature of about 400° to about 500° F.

5. The method of claim 4, wherein the groove is preheated to a temperature of about 450° F.

6. The method of claim 1, wherein the groove is formed to extend 360 degrees circumferentially around the rotor.

7. The method of claim 5, wherein the welding filler metal is deposited continuously in the groove circumferentially around the rotor, until the filler metal fills the groove.

8. The method of claim 1, wherein the groove is formed so as to have a floor and two side walls which rise at angles of about two to about three degrees from an imaginary center line which bisects the groove and which is perpendicular to the floor.

9. The method of claim 7, wherein the groove has a semi-trapezoidal cross-section.

10. The method of claim 1, wherein the welding filler metal includes about 2.0–2.5 weight percent chromium.

11. The method of claim 10, wherein the welding filler metal includes about 2.25 weight percent chromium.

12. The method of claim 1, wherein the welding filler metal includes about 0.8–1.2 weight percent molybdenum.

13. The method of claim 12, wherein the welding filler metal includes about 1.0 weight percent molybdenum.

14. The method of claim 1, wherein the welding filler metal includes about 0.25–0.35 weight percent vanadium.

15. The method of claim 14, wherein the welding filler metal includes about 0.3 weight percent vanadium.

16. The method of claim 1, wherein the welding filler metal further includes about 0.5–0.15 weight percent carbon, about 0.5–0.7 weight percent manganese, about 0.10–0.30 weight percent silicon, about 0.005–0.010 weight percent phosphorous, and about 0.001–0.005 weight percent sulfur, with the balance being substantially iron.

17. The method of claim 1, wherein the narrow groove welding technique comprises an automatic gas tungsten arc welding process.

18. A method of repairing a cracked or gouged high pressure steam turbine rotor, comprising the steps of:
forming a narrow groove having a floor and two sidewalls in the region of the crack or gouge, and having sufficient length, width and depth to completely remove the crack or gouge;
providing a ferrous-based welding filler metal wire which includes about 1.75–2.75 weight percent chromium, about 0.6–1.4 weight percent molybdenum, about 0.2–0.4 weight percent vanadium, about 0.05–0.15 weight percent carbon, about 0.5–0.7 weight percent manganese, about 0.10–0.30 weight percent silicon, about 0.005–0.010 weight percent phosphorous, about 0.001–0.005 weight percent sulfur, and a balance substantially of iron; and
welding the welding filler metal into the groove using an automatic gas tungsten arc welding process, until the filler metal fills the groove.

19. The method of claim 18, wherein the groove is formed to extend 360 degrees circumferentially around the rotor.

20. The method of claim 19, wherein the filler metal is deposited continuously in the groove circumferentially around the rotor, until the filler metal fills the groove.

21. The method of claim 18, wherein the welding is performed using an interpass temperature of about 500°–700° F.

22. The method of claim 21, wherein the welding is performed using an interpass temperature of about 600° F.

23. The method of claim 18, wherein the welding is performed, using a welding head travel speed of about 1–3 inches per minute.

24. The method of claim 23, wherein the welding is performed using a welding head travel speed of about 1.5–2.0 inches per minute.

25. The method of claim 18 wherein the welding is performed using a filler metal wire feed rate of about 18–22 inches per minute.

26. The method of claim 25, wherein the welding is performed using a filler metal wire feed rate of about 20 inches per minute.

27. The method of claim 18, wherein the welding is performed using a voltage of about 9–11 volts.

28. The method of claim 27, wherein the welding is performed using a voltage of about 9.5 volts.

29. The method of claim 18, wherein the welding is performed using current of about 240–250 amps at the sidewalls of the groove and about 140–150 amps between the sidewalls of the groove.

30. The method of claim 29, wherein the welding is performed using current of about 245 amps at the sidewalls of the groove and about 145 amps between the sidewalls of the groove.

31. A method of repairing a cracked high pressure steam turbine rotor, comprising the steps of:
forming a narrow groove in the region of the crack and extending 360 degrees circumferentially around the rotor, the groove having sufficient width and depth to completely remove the crack;
providing a ferrous-based welding filler metal which includes about 1.75–2.75 weight percent chromium, about 0.6–1.4 weight percent molybdenum, and about 0.2–0.4 weight percent vanadium;
preheating the groove to a temperature of about 400° to about 500° F.;
depositing the welding filler metal continuously in the groove circumferentially around the rotor, until the filler metal fills the groove;
raising the temperature of the groove gradually until a post weld heat treatment temperature of about 1200° to about 1300° F. is reached;
maintaining the groove of the post weld heat treatment temperature for a period of about 4 to about 8 hours; and
lowering the temperature of the groove gradually until the temperature falls below about 500° F.

32. The method of claim 31, wherein the temperature of the groove is raised at a rate of about 125° F. per hour until the post weld heat treatment temperature is reached.

33. The method of claim 31, wherein the temperature of the groove is lowered at a rate of about 125° F. per hour until the temperature falls below about 500° F.

34. The method of claim 31, wherein the post weld heat treatment temperature is about 1250° F.

35. A method of repairing a cracked or gouged rotating shaft, comprising the steps of:
forming a narrow groove in the region of the crack or gouge having a sufficient length, width, and depth to completely remove the crack or gouge;
providing a ferrous-based welding filler metal;
preheating the groove;
depositing the welding filler metal in the groove using a narrow groove welding technique, until the filler metal fills the groove; and
postheating the filled groove;
wherein the narrow groove welding technique comprises an automatic gas tungsten arc welding process.

36. The method of claim 35, wherein the welding filler metal further includes about 0.5–0.15 weight percent carbon, about 0.5–0.7 weight percent manganese, about 0.10–0.30 weight percent silicon, about 0.005–0.010 weight percent phosphorous, and about 0.001–0.005 weight percent sulfur, with the balance being substantially iron.

37. The method of claim 35, wherein the welding filler metal includes about 2.0–2.5 weight percent chromium.

38. The method of claim 37, wherein the welding filler metal includes about 2.25 weight percent chromium.

39. The method of claim 35, wherein the welding filler metal includes about 0.8-1.2 weight percent molybdenum.

40. The method of claim 39, wherein the welding filler metal includes about 1.0 weight percent molybdenum.

41. The method of claim 35, wherein the welding filler metal includes about 0.25-0.35 weight percent vanadium.

42. The method of claim 41, wherein the welding filler metal includes about 0.3 weight percent vanadium.

* * * * *

UNITED STATES PATENT AND TRADEMARK OFFICE
CERTIFICATE OF CORRECTION

PATENT NO. : 5,280,849
DATED : January 25, 1994
INVENTOR(S) : George W. Galanes

It is certified that error appears in the above-indentified patent and that said Letters Patent is hereby corrected as shown below:

ON THE TITLE PAGE

In column 1, line 6 under "References Cited U.S. PATENT DOCUMENTS", delete "4,902,888" and substitute --4,903,888--.

In column 5, line 25, delete "3.25≧4.00%" and substitute --3.25-4.00%--.

In column 7, line 14, third column of Table 1, delete "25 amps" and substitute --245 amps--.

Signed and Sealed this

Eighth Day of November, 1994

Attest:

BRUCE LEHMAN

*Attesting Officer*   *Commissioner of Patents and Trademarks*